R. H. McGINTY.

Picket Fence.

No. 9,570. Reissued Feb. 15, 1881.

WITNESSES:

Chas. Nida

C. Sedgwick

INVENTOR:

R. H. McGinty

BY Munn & Co

ATTORNEYS.

N. PETERS, PHOTO-LITHOGRAPHER, WASHINGTON, D. C.

UNITED STATES PATENT OFFICE.

ROBERT H. McGINTY, OF MOULTON, TEXAS.

PICKET-FENCE.

SPECIFICATION forming part of Reissued Letters Patent No. 9,570, dated February 15, 1881.

Original No. 143,632, dated October 14, 1873. Application for reissue filed October 16, 1880.

*To all whom it may concern:*

Be it known that I, ROBERT H. McGINTY, of Moulton, in the county of Lavaca and State of Texas, have invented a new and useful Improvement in Fences, of which the following is a specification.

The trouble and expense of building and preserving suitable fences in a country not stocked with timber must be apparent to all. In many sections it is difficult to obtain long fencing-timber, and in such cases the building of low fences of cheap short timber is resorted to.

The object of the invention is to form a fence of wood and wire with a straight top and zigzag base, as hereinafter described.

Figure 1:
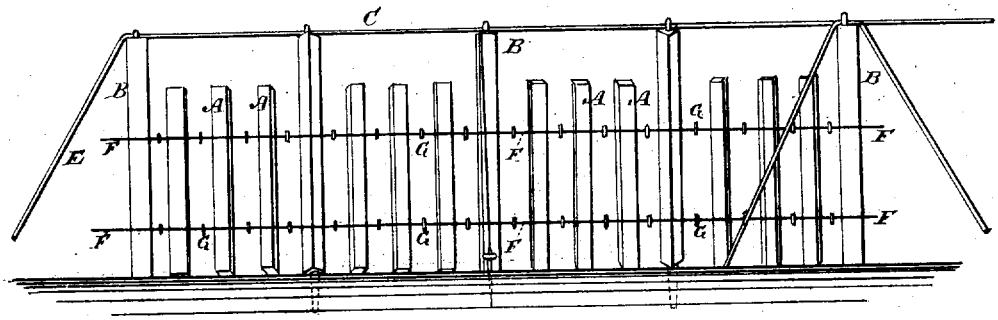
Figure 2:
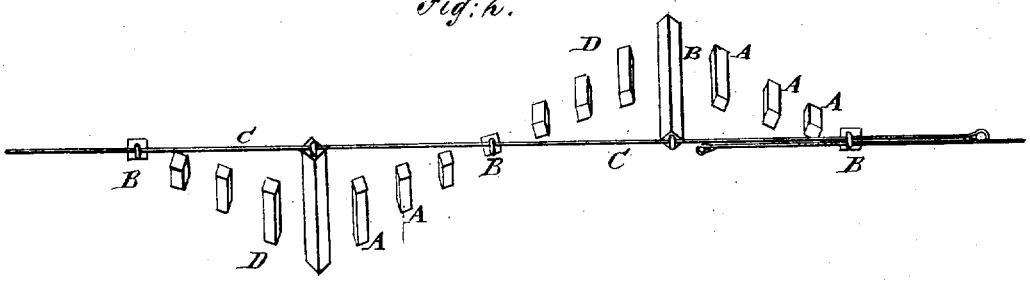
Figure 3:
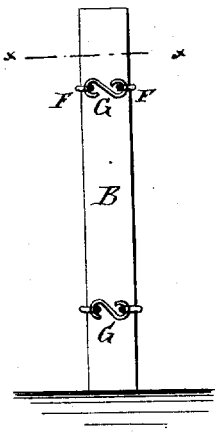
Figure 4:
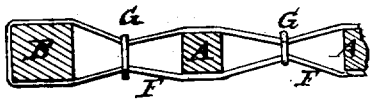

In the accompanying drawings, Figure 1 represents a side elevation; Fig. 2, a top or plan view. Fig. 3 is a detail, showing the mode of binding the wires together. Fig. 4 is a top view of the same.

Similar letters of reference indicate corresponding parts.

This fence is composed of two kinds of posts or bars. One kind—short in length and forming the main body of the fence, and marked A—rest upon the ground and form a low fence. The other posts (marked B) are arranged with the others at intervals, and are longer than the posts A, and whose top ends are on a line, as seen in Fig. 2. The posts (both long and short) are arranged in panels D, which brace alternately in each direction, as represented in Fig. 2; but the tops of the posts B should be so arranged as to stand in line and carry the high wire rider C, which takes the place of the ordinary wooden-rail rider. The posts B are anchored to the ground by other wires and stakes E.

F represents a wire on each side of all the posts at two places. These wires are bound together between the posts by the links G. The links are so applied that the wires are drawn tightly against the sides of the posts, thus binding all of them together, and rendering the fence strong and substantial.

A fence is thus made chiefly of short timber; but it will be durable and calculated to resist currents of water as well as wind.

The posts may be simple round or split timber formed of the bodies or limbs of trees, no sawed lumber being required. Any kind of wire that is strong enough will answer for the rider.

The advantages are: This fence can be constructed where timber is scarce and sawed lumber not to be obtained. It is cheap, and can be put up by any one at all skilled in ordinary farm operations.

I do not broadly claim a picket-fence arranged in zigzag form; but

What I claim is—

1. In a fence, the combination of a straight wire rider on high posts and zigzag stakes D, arranged in reverse angles on opposite sides of said rider, as shown and described.

2. A zigzag picket-fence consisting of panels D, bracing alternately in each direction, and having the tops of long posts B in alignment and carrying wire rider C, the long and short posts of said panels being clamped between two wires, F, which are bound together between the posts by cross-links G, substantially as shown and described, and for the purpose set forth.

ROBERT HENRY McGINTY.

Witnesses:

G. C. HARRIS,

HENRY W. DOCKERY.